United States Patent
Johnson et al.

(10) Patent No.: US 6,252,943 B1
(45) Date of Patent: Jun. 26, 2001

(54) TELEPHONE NETWORK HAVING DUAL GATEWAY INTERCONNECTION ARCHITECTURE FOR HANDLING EMERGENCY SERVICES

(75) Inventors: Leticia Garcia Johnson, Arvada, CO (US); Eugene M. Kancianic, Easton, PA (US); Maria Walsh, Hillsborough; Walter Paul Zahray, Matawan, both of NJ (US)

(73) Assignee: AT&T Corp, New York, NY (US)

( * ) Notice: Subject to any disclaimer, the term of this patent is extended or adjusted under 35 U.S.C. 154(b) by 0 days.

(21) Appl. No.: 09/433,505

(22) Filed: Nov. 3, 1999

(51) Int. Cl.[7] .................................................. H04M 11/00
(52) U.S. Cl. ............................................. 379/45; 379/219
(58) Field of Search .............................. 379/45, 207, 219, 379/220, 221, 224, 242, 246, 245

(56) References Cited

U.S. PATENT DOCUMENTS 4,757,267 * 7/1988 Riskin .................................. 379/219
6,067,356 * 5/2000 Lautenschlager et al. ............ 379/45
6,075,853 * 6/2000 Boeckman et al. ................... 379/207

* cited by examiner

Primary Examiner—Stella Woo

(57) ABSTRACT

A telephone network includes one or more end office switches not directly connected by a trunk line to a 911-type emergency tandem switch to handle emergency telephone calls. For those end office switches not so connected, a received emergency "9-1-1"-type telephone call is routed to a gateway switch having a trunk line connected to the emergency tandem. In the network, a first gateway switch connected to the emergency tandem switch provides the primary link, while a second gateway switch connected to the emergency tandem switch provides the secondary link. Routing information resident in end office switches is sent to the switch network to facilitate proper handling of an emergency call. The disclosed telephone network allows for less than full connectivity between gateway switches and an emergency tandem switch, while still providing a measure of redundancy to help ensure that an emergency call is completed.

18 Claims, 4 Drawing Sheets

Figure 1 - Prior Art

TELEPHONE NETWORK HAVING DUAL GATEWAY INTERCONNECTION ARCHITECTURE FOR HANDLING EMERGENCY SERVICES

FIELD OF THE INVENTION

This invention is related to telecommunication networks and, in particular, to a switch interconnection architecture and method to carry an emergency (911) telephone call from subscribers to a call center, known as a public safety answering point (PSAP).

BACKGROUND

Traditional 911 call distribution arrangements servicing complex metropolitan areas utilize a centralized switch to route police and fire emergency calls, known generally as 9-1-1 calls, to a correct Public Safety Answering Point (PSAP). Additional equipment is required at the PSAP to distribute calls to answering positions. Enhanced 911 (E911) service, an improvement over the traditional 911 service, consists of three major features: (1) selective routing of the 911 calls, (2) Automatic Number Identification (ANI), and (3) Automatic Location Identification (ALI). Selective routing, implemented through a switching system, routes a call to a correct PSAP, which is typically the PSAP designated to serve a calling party's calling area. In general such a routing is achieved by an end office by switching the incoming 911 call to a tandem switching system serving the PSAP via a trunk connection, and delivering the calling party's identification information as well as any location identification information in an information packet (in the case of a digital switching system) or by out-pulsing digits (when using an in-band switching protocol) to a destination switching system located at the designated PSAP. In cases where the location information is not delivered, the ANI is used as a key to look up the location information in a database.

Until recently, an incumbent local exchange carrier (ILEC) such as a Regional Bell Operating Company (RBOC) handled most of the 911 calls. A 911 call that typically originates within a service area of an ILEC end office switching system is routed to an E911 tandem switching system. The 911 emergency telephone services are also known as "lifeline" services, since they are a first recourse for a person in distress. In order to maintain an error-free operation of these lifeline services, telephone companies generally configured their networks to provide a fault-tolerant operation and very high availability. In general this is achieved by providing a "full connectivity" among the switches that route a call from a calling party's telephone number to a PSAP. In a "full connectivity" switching architecture, diverse dedicated trunks from every end office switching system to an E911 tandem switch are provided for each E911 service area. An example of this architecture is shown in FIG. 1 (PRIOR ART).

Referring now to FIG. 1 (PRIOR ART), a traditional "full connectivity" architecture is shown. One of a pair of E911 tandem switches 102 serving a PSAP 103 is connected by primary links 104a, 104b, 104c and also by secondary links 106a, 106b, 106c to each of three corresponding end office-type switches 108a, 108b, 108c, respectively. In FIG. 1, each of the end-office switches serve as gateways to a E911 tandem switch, and thus serve as gateway switches. Gateway switches 108a, 108c, 108c connect subscribers (i.e., customers) 110, 112 to the E911 tandem switch 102 through the primary and secondary links, and also connect the subscribers to a switch network 114 for connection to long distance and other services.

The gateway switches 108a, 108b, 108c are typically end office switches such as a Lucent 5ESS switching system, a Nortel DMS 100/200 switching system, or a Lucent 4ESS toll tandem. It is understood in FIG. 1 that the number of gateway switches is not limited to three and that multiple subscribers are serviced by any one gateway switch. It is also understood that gateway switch 108b also serves subscribers, though none are shown in the drawing. It is also understood that the links 104a–c and 106-c are typically trunk groups capable of handling multiple calls simultaneously.

A 9-1-1 call from subscriber 110 is placed via corresponding gateway switch 108a. When such a call is received by gateway switch 108a, that switch attempts to connect the subscriber to the E911 tandem switch via the primary link 104a. If the primary link 104a is unavailable due to failure or overload, the 9-1-1 call is routed via the secondary link 106a. Redundant primary and secondary links from each gateway switch help ensure that a 9-1-1 call goes through. Full connectivity in this context means that each gateway switch is provided with primary and secondary links to the E911 tandem switch.

As seen in FIG. 1, the prior art includes situations in which, for additional reliability, E911 tandems are deployed in mated pairs. This ensures that even if one E911 tandem ("E911-A") is down, its teamed E911 tandem ("E911-B") will serve as a backup. This ensures that the emergency call will go from the gateway through an E911 tandem and on to the proper PSAP, even in the event of a catastrophic loss of one of the E911 tandems. When mated pairs of E911 tandems are used, full connectivity comes in two forms: one in which each gateway is provided with a single link to each member of the E911 tandem pair, and a second in which each gateway is provided with primary and secondary links to each member of the E911 tandem pair.

The prior art also includes situations in which an end office must maintain multiple pairs of links to the E911 tandem, or to a multiplicity of 911 tandems, with each pair of links dedicated to 911 calls originating in a designated part of the end office serving area.

Such arrangements of providing a full connectivity architecture to ensure a fault-tolerant operation of the emergency lifeline services is feasibly for an ILEC switching system because, typically an ILEC end office switching system's service area is a small geographical area, and an ILEC typically serves each particular geographic location from a single end office.

With the passage of the Telecommunications Act of 1996, there arose an opportunity for competitive local exchange carriers (CLECs) such as AT&T to enter the local exchange market and start providing services similar to those offered by incumbent LECs (ILECs) to their residential and commercial customers. While the traditional ILEC end office service area is confined to a small geographical area such as a borough of a city, a CLEC may provide service to a very large geographical area from a single end office. In additional configurations, a CLEC may serve a single geographical area from many end offices. In such a scenario, it would not be feasible for the CLEC to configure its E911 switching architecture in a similar manner to that of an ILEC, i.e., according to a "full connectivity" architecture. This is because there will be an excessive amount of trunks connecting each end office with the E911 tandem 102, or a multiplicity of such E911 tandems when the CLEC end office serves a large geographic area, which could be prohibitively expensive.

Therefore, there is a need for a system and method of interconnecting end office switching systems owned and/or operated by a single entity with E911 tandem switches in a manner that requires fewer trunks than in a "full connectivity" architecture while still providing a fault-tolerant and highly available E911 service.

SUMMARY OF THE INVENTION

The present invention is directed to a telephone network having a first number of end office switches ("gateway switches") provided with direct links to an emergency tandem, a second number of end-office switches not provided with direct links to an emergency tandem, and a switch network configured to route calls between the various switches connected thereto. In the present invention, the switch network and the various end-office switch are configured such that an emergency call, such as a "9-1-1" call received at an end-office switch not provided with a direct link is routed through the switch network to one of the first number of gateway switches having a direct link to the emergency tandem.

The present invention is also directed to a method for routing an emergency call, received at an end-office switch not linked to an emergency tandem, to that emergency tandem via a gateway switch. The method of the present invention comprises receiving an emergency call at an end-office switch which does not have a direct link to an emergency tandem, providing emergency routing information to a switch network to facilitate connecting to a gateway switch which has a direct link to an emergency tandem, and completing the emergency call via a gateway switch having a primary link to the emergency tandem, if the primary link is available, or via a gateway switch having a secondary link to the emergency tandem, if the primary link is not available.

BRIEF DESCRIPTION OF THE DRAWINGS

The present invention is better understood with reference to the attached figures in which.

DETAILED DESCRIPTION OF THE PREFERRED EMBODIMENTS

Figure 2:
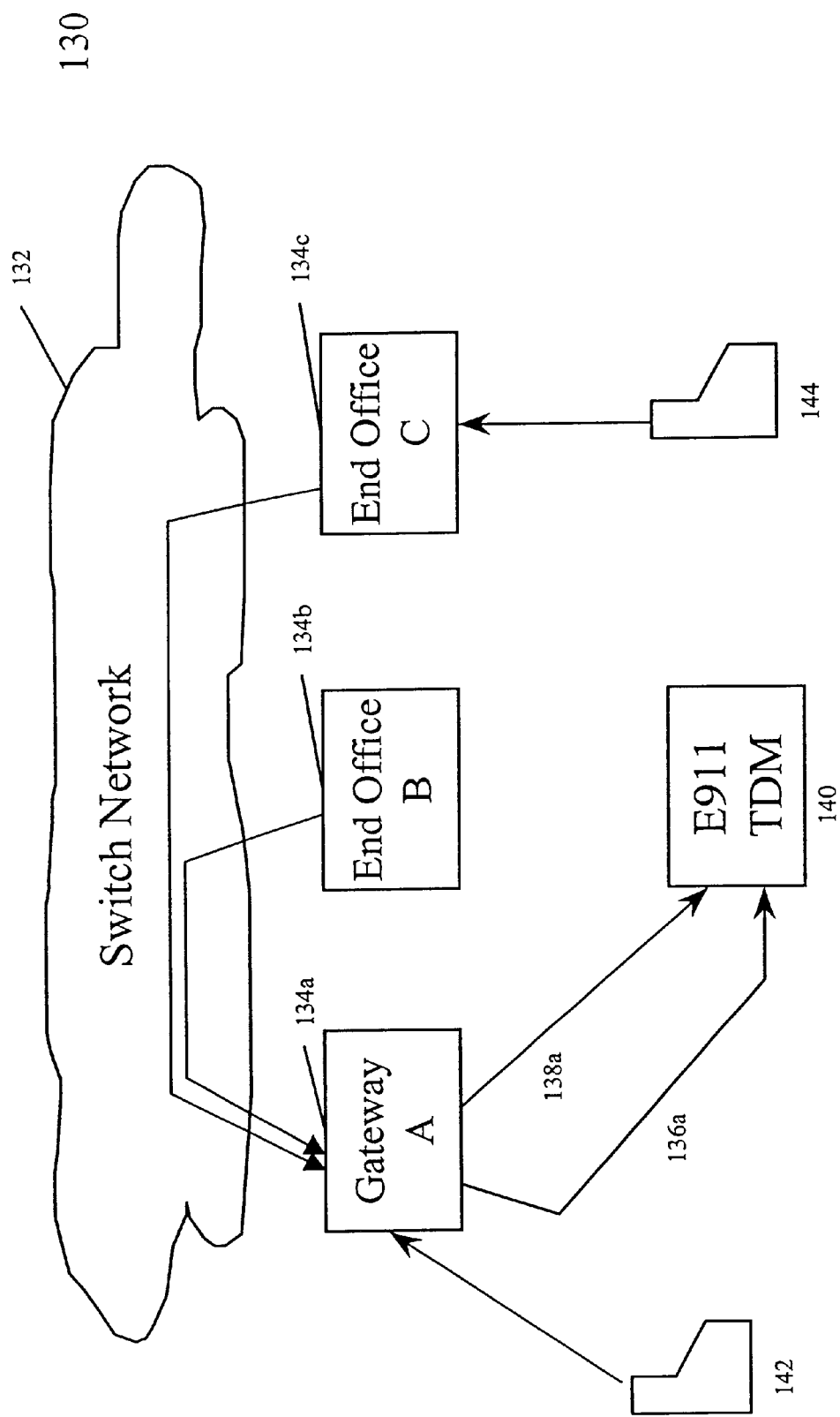
FIG. 2 shows a first embodiment for a telephone network for providing emergency services in accordance with the present invention.

FIG. 2. shows a first embodiment of a telephone network 130 in accordance with the present invention. Network 130 includes a switch network 132 which may be a real-time network routing-type network, such as that used by AT&T.

As is known to those skilled in the art, the switch network 132 normally comprises hardware and software which, among other things, can operate together to route calls between end office switches connected thereto. The telephone network 130 includes a single gateway switch 134a and two end-office switches 134b and 134c. Each of the switches 134a, 134b and 134c is connected to the switch network 132. As seen in FIG. 2, a first subscriber unit 142 is connected to gateway switch 134a and a second subscriber unit 144 is connected to an end-office switch 134c. It is understood that each of the three switches normally would have more than one subscriber unit attached thereto. Also as seen in FIG. 2, gateway switch 134a is connected to a "9-1-1" emergency tandem switch 140 via a primary link 136a and also via a secondary link 138a.

While FIG. 2 only shows one tandem switch 140, it is understood that a mated pair of tandem switches may be used instead, each member of the mated pair receiving one or more trunk lines from the gateway switch 134a. Regardless of whether a mated pair of tandem switches are used, among the three end-office switches in telephone network 130, only one switch, 134a, is a gateway switch having links to the emergency tandem 140, or to the mated pair of emergency tandems when applicable. If subscriber unit 142 requests emergency service, subscriber unit 142 places a 9-1-1 call received by the gateway switch 134a. Gateway switch 134a routes the emergency call via primary link 136b to the emergency tandem 140. If the primary link 136b is unavailable for any reason, gateway switch 134a then attempts to route the call via secondary link 138a. Thus, an emergency call from subscriber unit 142 using the telephone network 130 is substantially similar to an emergency call made by subscriber unit 110 via gateway switch 108a in FIG. 1.

Figure 1:
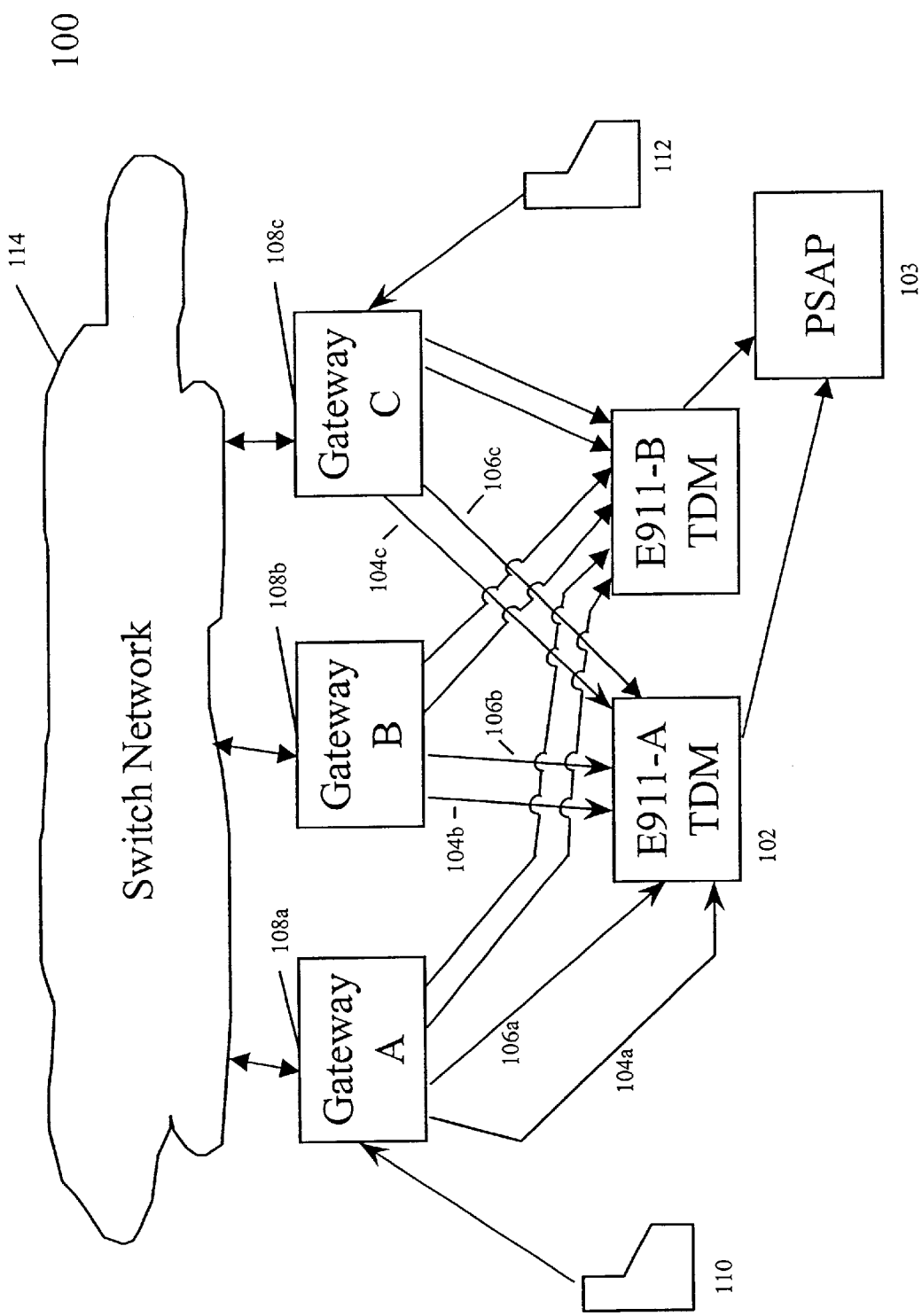
FIG. 1 shows a prior art full connectivity architecture for providing emergency service.

A key distinction between the telephone network 130 of FIG. 2 and the prior art telephone network 100 of FIG. 1 is that not all of the switches in telephone network 130 are connected by links to the emergency tandem. In the inventive telephone network 130, an emergency call from subscriber unit 144 is made via end office switch 134c across the switch network 132 to gateway switch 134a and then onto the emergency tandem switch 140. The handling of an emergency call from subscriber unit 144 is now discussed in further detail.

In telephone network 130 each of the switches 134a, 134b, 134c is provided with executable software and data to facilitate and implement the present invention. In particular each switch is provided with a first table comprising customer-specific information for the subscribers served on that switch, and a second table comprising routing information which stores specific routing treatments. Together, the two tables help translate (i.e., map) an incoming 9-1-1 call onto an appropriate path for routing that call to the emergency tandem 140. When any of these switches receives an emergency call from a subscriber, it has available at least two items of information: 1) the fact that the call is an emergency call, (e.g., "9-1-1" has been dialed) and 2) the automated line identification ("ANI"), which currently is a 10-digit telephone number which uniquely identifies the subscriber making the call.

In the telephone network 130, all emergency calls from subscribers located in a particular geographical area are routed to a particular gateway switch 134a which is designated to handle all emergency calls originated by customers in the particular geographic area If subscriber unit 144 made a 9-1-1 call, the call would be sent to the end office switch 134c; the end office switch 134c would consult its customer-specific information table and its routing information table to provide emergency routing information to the switch network 132 to ultimately transfer the call to gateway switch 134a, which is designated to handle all emergency calls to the emergency tandem 140; gateway switch 134a would then route the call through primary link 136b or, if necessary, through secondary link 138a. In the telephone network 130, under normal conditions, all emergency calls originating in the geographic area served by emergency tandem 140 ultimately will pass through gateway switch 134a regardless of which end office serves the customer. Thus, in this first embodiment, only a pair of links from a single gateway switch need be connected to the emergency tandem.

Figure 3:
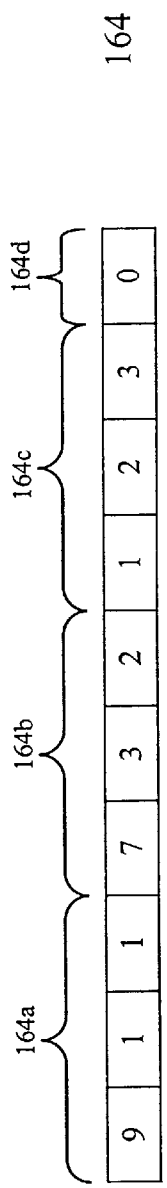
FIG. 3a conceptually illustrates a table storing customer-specific information for use in a telephone network in accordance with the present invention.
FIG. 3b conceptually illustrates a table storing routing information for use in a telephone network in accordance with the present invention.
FIG. 3c conceptually illustrates contents of emergency routing information used in a telephone network in accordance with the present invention.

FIG. 3a conceptually illustrates a customer-specific information table 150 in accordance with the present invention. Each end office switch, whether or not it serves as a gateway switch, has such a table which includes a plurality of customer-specific entries 152. at least one entry for each subscriber. Each entry 152 includes a subscriber ANI field 154 which includes the subscriber's POTS number, and a 911-specific routing information field 156 which provides geographic information about the subscriber's location to ultimately help identify the proper PSAP to which the 9-1-1 call is routed. In general, subscribers who are physically close to one another are likely to have the same specific routing information, even though they have different ANIs. In the preferred embodiment, the subscriber ANI field 154 is ten digits long and comprises the caller's 3-digit area code and 7-digit phone number, and the 911-specific routing information 156 is 3 digits long.

FIG. 3b conceptually illustrates a routing information table 160 in accordance with the present invention. Each end office switch on a network, whether or not it serves as a gateway switch, has the same routing information table which includes a plurality of route-specific entries 162. Each route-specific entry 162 includes an emergency routing number 164, a first preferred routing treatment 166 and may also have a second preferred routing treatment 168. Thus, the emergency routing number 164 indexes its associated first and second routing treatments, 166 and 168, respectively.

It is understood that the customer-specific information table 150 and the routing information table 160 are not literally 'tables', but rather are typically implemented as some sort of data structures and the information contained therein is stored in a database resident in a non-volatile memory on a server computer which is contained within or accessible to the various switches needing them. The database comprising customer-specific information is updated from time to time to reflect the addition or deletion of subscribers in a particular geographical area, and the database comprising the routing information is updated from time to time to reflect configurational changes in the switches.

In the preferred embodiment, the emergency routing number 164 is a 10-digit number, which makes its length compatible with data fields in data structures which handle 10-digit POTS numbers. The routing treatments each consist of two components: a route type and route data. The route type has two possible values. The first possible route type, Trunk Group (TG), specifies routing out of the switch on a particular trunk group or prioritized list of trunk groups as indicated by the associated routing data. The second possible route type, Destination Switch (DS), specifies routing through the switched network, using whatever paths are available, to a particular switch as indicated by the associated routing data. The first routing treatment 166 provides information as to the primary route which corresponds to a particular emergency routing number. The second routing treatment 168 provides information as to the secondary route to be used if the primary route is unavailable. It is noted, however, that in those networks having only a single gateway switch to the E911 tandem, such as depicted in FIG. 2, no second routing treatment is provided for. It is understood, however, that the present invention is not limited to two routes and that, in the general case, more than two 911 routes can be supported, and that additional treatments such as routing to an operator services platform can be specified for situations when the secondary 911 route is unavailable.

FIG. 3c conceptually illustrates a possible format showing the various fields which make up an emergency routing number 164. In the present preferred embodiment, the emergency routing number is a 10-digit number. The present preferred embodiment uses a 10-digit emergency routing number simply because it is a length which is compatible with current telephone routing methods, such as typical POTS numbers. It is understood, however, that the present invention is not limited to only 10-digit emergency routing numbers and that, in the general case, some other number of digits may be used to form the emergency routing number 164.

In the emergency routing number 164, field 164a comprises a 3-digit code which designates the type of call that is being handled—in the preferred embodiment, this field is occupied by the digits 9-1-1. Field 164b includes information reflective of coarse geographic location information and, in the preferred embodiment, comprises a 3-digit area code. Field 164c includes information reflective of finer geographic information within the geographical area represented by the coarse geographical information and, in the preferred embodiment, comprises three digits corresponding to up to 1000 smaller regions within the area code of field 164b to help better localize a subscriber. More preferably, the finer geographical information is the same as the 911-specific routing information 158 from the customer-specific table 150. Finally, in the preferred embodiment, field 164d is an unused single-digit field occupied by a 0 value. It should be noted, however, that field 164d may instead include information of significance, pending future uses and expansion. While the present preferred embodiment of the emergency routing number 164 has four fields, it should be kept in mind that the number of fields and the type of information placed in those fields may also vary in the general case.

The processing performed by an end office receiving an emergency call from one of its subscribers now becomes clear. With reference of FIG. 2, when subscriber 144 places an emergency call, end office 134c receives this call. The end office 134c thus knows that the call is an emergency call and also knows the subscriber's ANI . Upon seeing that it is an emergency call, the end office consults its customer-specific information table 150 and extracts the 911-specific routing information 156 corresponding to that subscriber's ANI. The end office 134c then constructs a routing number 164 along the lines of that shown in FIG. 3c. To do this, the end office 134c places 9-1-1 in field 164a because the call is an emergency call, places the area code from the ANI in field 164b, places the 911-specific routing information 158 into field 164c and inserts a 0 into field 164d.

Once the routing number 164 has been created by the end office 134c, the end office consults the routing table 160 and extracts the routing entry 162 indexed by the thusconstructed routing number. In this particular example, the first routing treatment 166 will be type DS, with routing data indicating to route to gateway switch 134*a*. This instructs end office 134*c* to route the call over the switch network 132, which in the presently preferred embodiment is AT&T's Real Time Network Routing (RTNR) system, to the gateway switch 134*a*.

In this manner, the emergency call is routed from the end office switch 134*c* through the switch network 132 and onto designated gateway switch 134*a*. Designated gateway switch 134*a* receives the routing number 164 and subscriber ANI 154 associated with the call. Gateway switch 134*a* then uses the routing number 164 to consult the copy of routing table 160 that is associated with switch 134*a*. In this particular example, the first routing treatment 166 will be type TG, with routing data indicating the ordered list of trunk groups comprising links 136*b* and 138*a* to the E911 tandem 140. The gateway switch 134*a* then delivers the call with subscriber ANI to the emergency tandem 140 which completes the call to the appropriate PSAP. From the foregoing description of the first embodiment shown in FIG. 2, it is evident that the network has less than full connectivity because it includes at least one end office switch which is not connected to the emergency tandem (and so is not a gateway switch as the term is used herein).

Also, while the telephone network 130 only shows a single gateway switch having primary and secondary links to the emergency tandem, it should be kept in mind that this embodiment also contemplates situations in which a first plurality of end offices are provided with both primary and secondary links to the emergency tandem and thus serve as gateway switches, while at least one other end office has no direct links to the emergency tandem. In such case, some form of prioritization is provided so as to determine which of the first plurality of gateway switches is to complete the call to the emergency tandem. This prioritization may be provided for in a field of the emergency routing information itself, or may be arbitrated by the switch network based on a set of well-defined heuristics.

Figure 4:
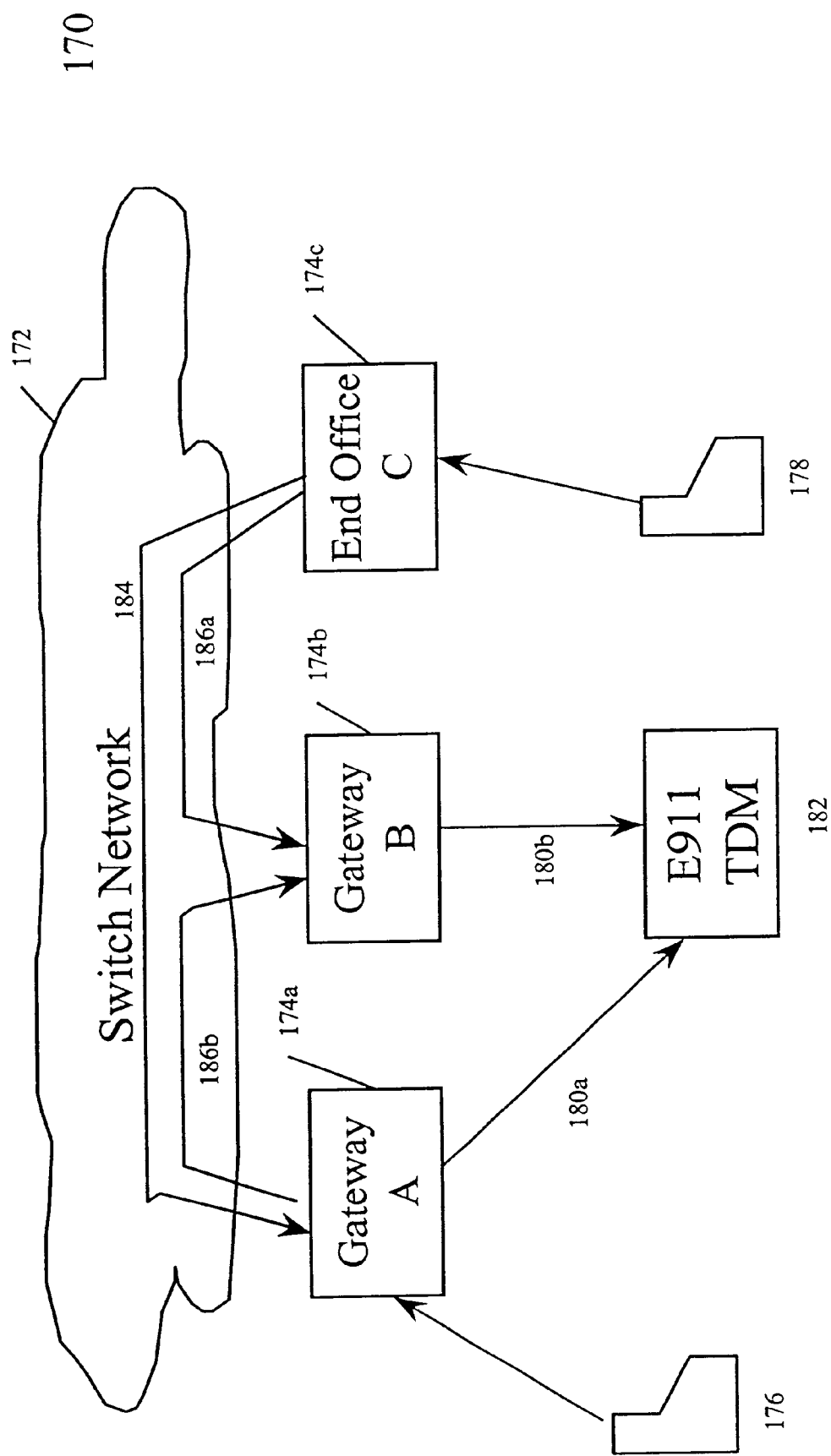
FIG. 4 shows a second embodiment for a telephone network for providing emergency services in accordance with the present invention.

FIG. 4 shows a second embodiment of a telephone network 170 in accordance with the present invention. Telephone network 170 includes the aforementioned RTNR-type switch network 172 which facilitates the routing of calls between gateway switches 174*a* and 174*b* and an end office switch 174*c*. In telephone network 170, subscriber unit 176 is connected to gateway switch 174*a* and subscriber unit 178 is connected to end office switch 174*c*, much in the same manner as discussed with respect to telephone network 130 of FIG. 2. Furthermore, gateway switch 174*a* is provided with a primary link 180*a* and gateway switch 174*b* is provided with a secondary link 180*b* to the emergency tandem 182. Thus, in this second embodiment, the telephone network 170 has only a single link between each of at least two gateway switches to the emergency tandem 182. This arrangement helps ensure that an emergency call will be connected to the emergency tandem, despite a catastrophic loss of either of the two gateway switches 174*a*, 174*b*, or the unavailability of primary and secondary links 180*a*, 180*b*, respectively.

If subscriber unit 178 makes an emergency call, that call first goes to end office switch 174*c*, which has no direct link to the emergency tandem 182. When end office switch 174*c* receives an emergency call, it creates a routing number 164 as discussed above and attempts to complete the call using the first routing treatment 166, which identifies the primary designated gateway switch 174*a*. This is done by trying to route the call through the switch network 172, which tries to connect the call to the primary designated gateway switch 174*a*, as conceptually represented by primary path 184. Primary designated gateway switch 174*a*, in turn, attempts to complete the emergency call to the emergency tandem 182. If either primary designated gateway switch 174*a* or primary link 180*a* is unavailable, the emergency call is released back to the originating end office 174*c*. End office 174*c* then attempts to complete the call using the second routing treatment 168, which identifies the secondary designated gateway switch 174*b* and secondary link 180*b*, as conceptually represented by a secondary path 186*a*.

If subscriber unit 176 makes an emergency call, that call first goes to primary designated gateway switch 174*a* acting in the capacity of an end office. Gateway switch 174*a* constructs a routing number 164 using its own customer-specific table. For the routing number created, the routing table 160 indicates a first routing treatment 166 of using, trunk 180*a* connected to that same gateway switch 174*a*, and a second routing treatment 168 of using gateway switch 174*b* and associated trunk 180*b*. If the first route through trunk 180*a* is unavailable, the call is routed to gateway switch 174*b* and is delivered to switch 174*b* with the routing number created at switch 174*a*, as conceptually represented by secondary path 186*b*. Gateway switch 174*b* will direct calls received from other switches (such as gateway switch 174*a*) to trunk 180*b*, based on the received routing number and other routing information tables resident in gateway switch 174*b*.

In the preferred embodiment, primary designated gateway switch 174*a* is the primary route for handling all emergency calls, regardless of their origin. Therefore, if a subscriber attached to secondary gateway switch 174*b* places an emergency call, that call is sent by secondary gateway switch 174*b* through the switch network to primary gateway switch 174*a* in an attempt to complete the call via primary link 180*a*. Only if primary gateway switch 174*a*, or primary link 180*a*, is unavailable is the emergency call completed via secondary link 180*b*. Thus, the fact that the subscriber telephone placing the emergency call is connected to the secondary gateway switch 174*b* does not, in the preferred embodiment, mandate that an attempt be made to first use the secondary link. It should be noted, however, that this feature is not an absolute requirement of the present invention, which also contemplates completing an emergency call between the receiving gateway switch and the emergency tandem via a direct link, if one is provided.

Also, with regard to FIG. 4, while only one tandem switch 182 is shown, it is understood that a mated pair of tandem switches may be used instead, each member of the mated pair receiving one or more trunk lines from the gateway switches 174*a*, 174*b*, but neither member of the mated pair receiving any trunk lines from end office switch 174*c*.

While the above invention has been described with reference to certain preferred embodiments, it should be kept in mind that the scope of the present invention is not limited to these. One skilled in the art may find variations of these preferred embodiments which, nevertheless, fall within the spirit of the present invention, whose scope is defined by the claims set forth below.

What is claimed is:

1. A telephone network configured to route an emergency call between a subscriber telephone and an emergency tandem switch, said telephone network comprising:

a first switch having a first link to an emergency tandem switch and at least one connection to a first subscriber telephone;

a second switch having a second link to said emergency tandem switch and at least one connection to a second subscriber telephone;

a third switch having no link to said emergency tandem switch, said third switch having at least one connection to a third subscriber telephone, said third switch having customer-specific routing information indicative of a location of said third subscriber telephone within a geographical area covered by an area code of said third subscriber telephone; and a switch network configured to route calls between said first, second and third switches; wherein said first, second and third switches and said switch network are configured such that upon receipt of an emergency call from said third subscriber telephone, said third switch routes said emergency call to said emergency tandem switch, based at least in part on said customer-specific routing information, via said switch network and also (a) via said first switch and said first link, if said first switch and said first link are available; and (b) via said second switch and said second link, if either said first switch or said first link are not available.

2. The telephone network according to claim 1, wherein said third switch is arranged to create a routing number configured to index a first routing treatment directing said emergency call to said first switch, and configured to index a second routing treatment directing said emergency call to said second switch.

3. The telephone network according to claim 2, wherein said routing number includes information identifying said call as an emergency call.

4. The telephone network according to claim 3, wherein said routing number includes information identifying an area code of said subscriber telephone.

5. The telephone network according to claim 4, wherein said routing number includes said customer-specific routing information.

6. The telephone network according to claim 2, wherein said routing number is a 10-digit number.

7. The telephone network according to claim 6, wherein the 10-digit routing number includes an area code of the third subscriber telephone and a representation of a geographical location of the third subscriber telephone.

8. The telephone network according to claim 1, wherein the first and second links are trunk lines.

9. A method for completing an emergency call between an end office switch and an emergency tandem switch wherein the end office switch is not directly connected to said emergency tandem switch, the method comprising:

receiving, at said end office switch, an emergency call from a subscriber connected thereto;

creating, at said end office switch, 10-digit routing information including within the 10 digits, an area code of the subscriber and a representation of a geographical location of said subscriber, said geographical location sufficient to identify at least one public safety answering point designated to answer said emergency call;

determining at least first and second routing treatments for directing the emergency call to a gateway switch connected to said emergency tandem switch, based on said routing information;

transferring said routing information and said emergency call to a gateway switch, based on at least one of said first and second routing treatments; and routing said emergency call to said emergency tandem switch, based on said routing information, (a) via a first gateway switch having a first link to said emergency tandem switch, if said first gateway switch and said first link are available; and (b) via a second gateway switch having a second link to said emergency tandem switch, if either said first gateway switch or said first link are unavailable.

10. A telephone network configured to route an emergency call between a subscriber telephone and an emergency tandem switch, said telephone network comprising:

a first switch having a first link and a second link to an emergency tandem switch and at least one connection to a first subscriber telephone;

a second switch having no link to said emergency tandem switch, said second switch having at least one correction to a second subscriber telephone, said second switch having customer-specific routing information indicative of a location of said second subscriber telephone within a geographical area covered by an area code of said second subscriber telephone; and a switch network configured to route calls between said first and second switches; wherein said first and second switches and said switch network are configured such that upon receipt of an emergency call from said second subscriber telephone, said second switch routes said emergency call to said emergency tandem switch, based at least in part on said customer-specific routing information, via said switch network and also (a) via said first link, if said first link is available; and (b) via and said second link, if said first link is not available.

11. The telephone network according to claim 10, wherein said second switch is arranged to create a routing number configured to index a routing treatment directing said emergency call to said first switch.

12. The telephone network according to claim 11, wherein said routing number includes information identifying said call as an emergency call.

13. The telephone network according to claim 12, wherein said routing number includes information identifying an area code of said subscriber telephone.

14. The telephone network according to claim 13, wherein said routing number includes said customer-specific routing information.

15. The telephone network according to claim 11, wherein said routing number is a 10-digit number.

16. The telephone network according to claim 15, wherein the 10-digit routing number includes an area code of the second subscriber telephone and a representation of a geographical location of the second subscriber telephone.

17. The telephone network according to claim 10, wherein the first and second links are trunk lines.

18. A method for completing an emergency call between an end office switch and an emergency tandem switch wherein the end office switch is not directly connected to said emergency tandem switch, the method comprising:

receiving, at said end office switch, an emergency call from a subscriber connected thereto;

creating, at said end office switch, 10-digit routing information including within the 10 digits, an area code of the subscriber and a representation of a geographical location of said subscriber, said geographical location sufficient to identify at least one public safety answering point designated to answer said emergency call;

determining at least a first routing treatment for directing the emergency call to a first gateway switch connected to said emergency tandem switch, based on said routing information;

transferring said routing information and said emergency call to said first gateway switch, based on said first routing treatment; and routing said emergency call to said emergency tandem switch, based on said routing information,
  (a) via a first link connected between said first gateway switch and said emergency tandem switch, if said first link is available; and
  (b) via a second link connected between said first gateway switch and said emergency tandem switch, if said first link is unavailable.

\* \* \* \* \*